United States Patent [19]
Gion

[11] 3,792,960
[45] Feb. 19, 1974

[54] HEARTH FOR A FURNACE FOR THE THERMAL TREATMENT OF PRODUCTS SUPPORTED BY A GAS CUSHION

[75] Inventor: Leon Gion, Lourdes, France
[73] Assignee: Ceraver, Paris, France
[22] Filed: Jan. 24, 1972
[21] Appl. No.: 220,031

[30] Foreign Application Priority Data
Jan. 22, 1971 France .................. 7102205

[52] U.S. Cl. .................. 432/58, 432/11, 34/156, 302/31
[51] Int. Cl. .................. F27d 5/00, F27d 3/12
[58] Field of Search ...... 214/1 BE; 263/6, 28, 21 A, 263/46; 34/57 A, 156, 31; 266/21; 302/31; 432/11, 155, 58, 82, 122

[56] References Cited
UNITED STATES PATENTS

| 3,184,224 | 5/1965 | Shelly | 432/11 |
| 2,215,581 | 9/1940 | Fackt | 432/155 |
| 3,610,696 | 10/1971 | Fulton | 302/31 |
| 2,622,864 | 12/1952 | Hasche | 263/51 |
| 2,678,237 | 5/1954 | Allander et al. | 214/1 |
| 2,577,170 | 12/1951 | Walters | 263/51 |
| 3,455,670 | 7/1969 | McMaster | 214/1 |

Primary Examiner—John J. Camby
Assistant Examiner—Henry C. Yuen
Attorney, Agent, or Firm—Sughrue, Rothwell, Mion, Zinn & Macpeak

[57] ABSTRACT

A hearth for thermal treatment of non-granular products supported by a gas cushion comprises a number of ceramic plates arranged to provide gas passages for the support gas. The ceramic plates can be planar with cylindrical grooves on one or both sides. The ceramic plates can also have a serrated configuration to form diamond shape gas passages.

7 Claims, 5 Drawing Figures

HEARTH FOR A FURNACE FOR THE THERMAL TREATMENT OF PRODUCTS SUPPORTED BY A GAS CUSHION

BACKGROUND OF THE INVENTION

1. Field of the Invention

The present invention relates to a hearth for a furnace for the thermal treatment of non-granular products supported by a gas supporting cushion, constituted by the juxtapositioning of ceramic material plates, each of which has on at least one of its sides a profile co-operating with that of the adjacent plate to form orifices for the passage of the support gas.

2. Description of the Prior Art

In furnaces for the thermal treatment of products, notably for the baking of ceramic products supported by a gas cushion, the products to be treated are supported and transported, either directly or through the intermediary of appropriate supports, on a gas cushion blown-in through a porous or perforated hearth dividing the furnace tunnel into two portions and through which circulate the support gases flowing from a portion wherein they are under a predetermined pressure to a further portion wherein a lower pressure exists.

The construction of furnaces of this type involves serious difficulties, notably when the furnace is required to function at high temperature. In fact, the porous or perforated hearth is subjected to mechanical stresses due to its weight or the gas pressure while, at the same time, it is permanently subjected to the action of the extremely high temperatures existing in the furnace.

The gas-permeable hearth is generally constructed with a slab or series of contiguous slabs of porous or perforated ceramic material. In the former case, the mechanical resistance depends on the porosity and decreases when the latter increases. It will readily be appreciated that the cohesion of the member depends on the contact bonding between the grains. As soon as the porosity attains a noteworthy value, the number of inter-granular contacts is inadequate and hot creepage is inevitable.

If the hearth is constituted by a slab perforated with multiple uniformly distributed apertures, this member is difficult and costly to machine and develops flaws, which may or may not be visible and which impair the mechanical strength.

There has already been proposed, in U.S. Pat. No. 2,371,619, a hearth for a furnace for the treatment of pulverulent products consisting of inclined, juxtaposed elements bearing one on the other, each element comprising a plane face and a face formed with recesses, in such a manner as to afford, after application against the plane face of the adjacent element, conduits for the passage of a gas for the chemical or physical treatment of a pulverulent product. The conduits extend in the direction of advancement of the pulverulent product in the furnace. Such a furnace is not suitable for the treatment of non-granular products, since the high pressure of the gas necessary for supporting the products would result in displacement of the elements relative to each other and, consequently, in the rapid deterioration thereof.

SUMMARY OF THE INVENTION

It is therefore, an object of the invention to provide a hearth for the thermal treatment of articles which does not have the above-discussed disadvantages and which permits the treatment of non-granular products, and which furthermore has a higher degree of thermo-mechanical strength than that of a porous hearth, while at the same time being simple and inexpensive to manufacture, with the gas-permeability thereof being clearly defined and involving a relatively small degree of support gas pressure drop.

A hearth according to the present invention is characterized in that the plates are set on edge and in that each one thereof has a height sufficient to resist the flexion forces due to the pressure of the support gases.

It comprises, preferably, at least one of the following features:

the grooves in the profile of one plate co-operate with the opposite grooves in the adjacent plates, the profiles of the plates are such that the passage orifices formed are inclined relative to the vertical, the thickness of the plates is close to the minimum value compatible with easy manufacture and absence of deformation on baking, the hearth slopes slightly in the direction of the longitudinal axis of the furnace, the slope being sufficient to maintain the plates in contact with each other due to their own weight, the plates bear upon shoulders on the lateral supports.

The cross-section of the grooves in the plates and the number and position thereof are determined as a function of the permeability of the hearth relatively to the support gas which it is desired to obtain.

BRIEF DESCRIPTION OF THE DRAWINGS

Hereinbelow, there are described by way of example and with reference to the accompanying drawings, various forms of plate according to the invention and a support therefor.

DESCRIPTION OF THE PREFERRED EMBODIMENT

Figure 1:
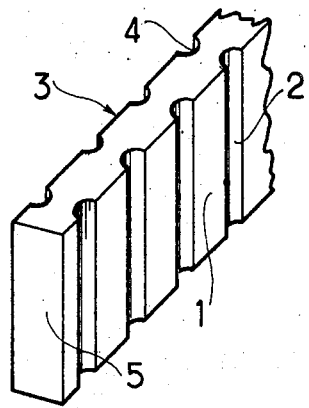
FIG. 1 shows, in perspective, a portion of a plate formed with grooves in two sides.

The plate shown in FIG. 1 has its face perpendicular to the direction of advance of the products in the furnace and is formed with vertical cylindrical grooves 2. The opposite face 3 (not shown) is also formed with vertical cylindrical grooves 4. The lateral face 5 is intended to bear on the side of the furnace tunnel. It will be appreciated that two adjacent, united plates define vertical cylindrical orifices for the passage of the support gases.

Figure 2:
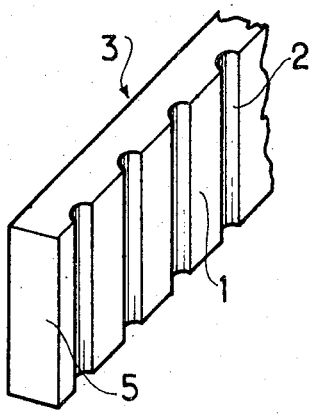
FIG. 2 shows a perspective view of a plate formed with grooves in only one of its sides.

The plate shown in FIG. 2 is formed with grooves 2 only on its face 1, the other face 3 being plane. This structure makes it possible to allow the juxtaposed plates a predetermined degree of freedom for relative displacement, so as to avoid stressing due to differences in expansion.

Figure 3:
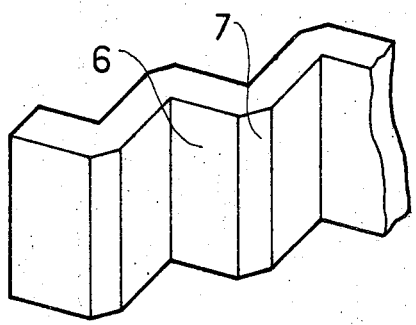
FIG. 3 shows, in perspective, a zig-zag profile plate having support faces on the adjacent plates.

The plate shown in FIG. 3 is formed with prismatic grooves 6 separated by plane faces 7 permitting the abutting of the plates one against the other.

Figure 4:
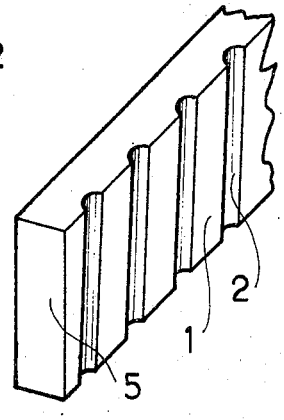
FIG. 4 shows, in perspective, a plate formed with grooves enclosing an angle with the vertical, in such manner that the support gases promote the propulsion into the furnace of the products to be baked.

The plate shown in FIG. 4 is similar to that of FIG. 2, but the grooves 2 thereof are inclined relative to the vertical, either to promote the advance of the products requiring to be submitted to thermal treatment, or to maintain the latter in the longitudinal axis of the furnace.

The plates may be maintained in contact with each other by refractory wedges or by means of their own weight, by giving the hearth a slight degree of slope within the axis of the furnace.

Figure 5:
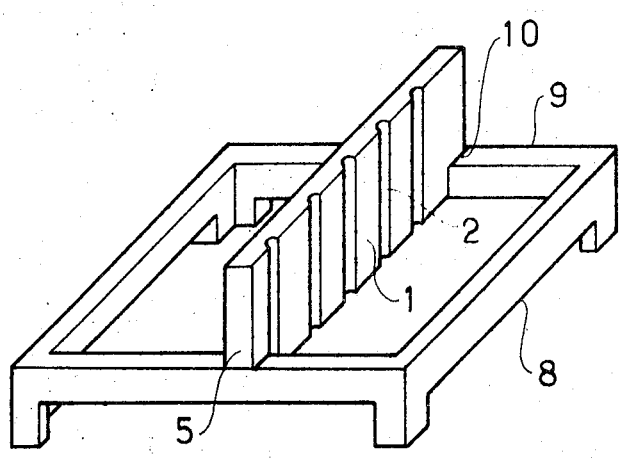
FIG. 5 shows, in perspective, a plate support.

It is also possible to dispose a predetermined number of plates in the supports such as those shown in FIG. 5, in such manner as to constitute elements which are disposed end-to-end to constitute the hearth. This makes it possible, in particular, to readily dispose the plates not only perpendicular to the axis of the furnace but also parallel or obliquely relatively to the axis. The support 8 comprises lateral flanges 9 on which plates such as 1 bear through the agency of shoulders 10. The flanges may also be grooved or ribbed, in such manner as to co-operate with grooves or ribs on the shoulders of the plates, so as to facilitate their maintenance in position thereof. If deemed necessary, it will be possible to render the various plates fast with each other, for example, by means of a light sticking procedure, which may be promoted by judicious choice of the ceramic composition of the plates or utilization of a light layer of enamel.

Although the embodiments described are preferred, it will be understood that various modifications could be made in the hearth for thermal treatment just described, without exceeding the scope of the invention.

In particular, the orifices formed by the juxtapositioning of the plates could be, for example, non-cylindrical such as nozzle-shaped.

What is claimed is:

1. A hearth for a tunnel furnace for the thermal treatment of solid, non-granular products supported by a support gas cushion, said hearth comprising a plurality of plates of ceramic material juxtaposed horizontally in a single layer, each of said plates comprising on at least one of its sides a profile co-operating with that of the adjacent plate to form orifices for the passage of the support gases, the plates being set on edge and each of them having a height sufficient to resist the flexing forces due to the pressure of the support gases.

2. A hearth according to claim 1, wherein grooves in the profile of a plate co-operate with opposite grooves of the adjacent plate.

3. A hearth according to claim 2, wherein the profiles of each plate are such that the passage orifices formed are inclined relative to the vertical.

4. A hearth according to claim 2, wherein each plate has a serrated configuration and forms with the adjacent plates diamond shaped gas passages.

5. A hearth according to claim 1, wherein it has a slope in the direction of the longitudinal axis of the furnace sufficient to maintain the plates in contact with each other due to their own weight.

6. A hearth according to claim 5, wherein the plates bear on lateral supports through the intermediary of shoulders.

7. A hearth according to claim 1, wherein the profiles of each plate are such that the passage orifices formed are inclined relative to the vertical.

* * * * *